(12) United States Patent
Nedzlek et al.

(10) Patent No.: US 9,272,341 B2
(45) Date of Patent: Mar. 1, 2016

(54) DEVICE AND METHOD FOR GENERATING MICROSTRUCTURES IN CYLINDRICAL SURFACES

(71) Applicant: Walter AG, Tubingen (DE)

(72) Inventors: Kevin Nedzlek, Jefferson, WI (US); Kenneth Baertson, Commerce Township, MI (US)

(73) Assignee: Walter AG, Tübingen (DE)

( * ) Notice: Subject to any disclaimer, the term of this patent is extended or adjusted under 35 U.S.C. 154(b) by 285 days.

(21) Appl. No.: 13/951,576

(22) Filed: Jul. 26, 2013

(65) Prior Publication Data

US 2014/0050544 A1   Feb. 20, 2014

Related U.S. Application Data

(60) Provisional application No. 61/684,446, filed on Aug. 17, 2012.

(51) Int. Cl.
*B23B 29/034* (2006.01)
*B23C 3/12* (2006.01)
(Continued)

(52) U.S. Cl.
CPC ........... *B23C 3/124* (2013.01); *B23B 29/03453* (2013.01); *B23B 41/12* (2013.01); *B23C 3/28* (2013.01); *B23C 5/16* (2013.01); *B23B 2220/12* (2013.01); *B23B 2220/123* (2013.01); *B23B 2270/24* (2013.01); *Y10T 82/10* (2015.01); *Y10T 408/03* (2015.01); *Y10T 408/44* (2015.01); *Y10T 408/85* (2015.01); *Y10T 408/858* (2015.01)

(58) Field of Classification Search
CPC ............ B23B 29/034; B23B 29/03432; B23B 29/03446; B23B 29/03453; B23B 29/03464; B23B 29/03475; B23B 29/03485; B23B 29/03496; B23B 45/12; B23B 2220/123; B23B 2220/12; C23C 4/02; Y10T 82/10; Y10T 82/12; Y10T 82/125; Y10T 82/128
USPC ...................................... 82/1.2, 1.4, 1.5, 1.11
See application file for complete search history.

(56) References Cited

U.S. PATENT DOCUMENTS 3,888,161 A * 6/1975 Baudermann ................. 409/132
5,622,753 A * 4/1997 Shepley et al. ............... 427/453
(Continued)

FOREIGN PATENT DOCUMENTS

DE   102006045275   2/2008
DE   102008024313   12/2009
(Continued)

OTHER PUBLICATIONS

Office Action in German Application No. 10 2013 108 604.7 dated Nov. 12, 2014.

*Primary Examiner* — Sunil K Singh
*Assistant Examiner* — Alan Snyder
(74) *Attorney, Agent, or Firm* — Morgan. Lewis & Bockius LLP

(57) ABSTRACT

Tool and method for generating microstructures within cylindrical surfaces with a higher degree of efficiency, thereby allowing to provide cylindrical surfaces with a corresponding microstructure in much shorter cycle time. Cutting elements of the tool are arranged within seats to be radially displaceable in said seats during rotation of said tool body. The cutting elements are radially displaceable at least between two different radial positions, namely a radially retracted and a radially extended position. The cutting elements can be evenly distributed about the circumference of the tool at the same radial distance such that the tips of the cutting teeth and also the seats define a common cylindrical envelope surface the axis of which coincides with the axis of the tool body.

21 Claims, 5 Drawing Sheets

(51) Int. Cl.
  *B23C 3/28*     (2006.01)
  *B23C 5/16*     (2006.01)
  *B23B 41/12*    (2006.01)

(56) References Cited

U.S. PATENT DOCUMENTS

| | | | |
|---|---|---|---|
| 7,090,445 B2 * | 8/2006 | Woodruff et al. | 408/59 |
| 2003/0002938 A1 * | 1/2003 | Maar | 408/168 |
| 2005/0064146 A1 | 3/2005 | Hollis et al. | |
| 2010/0031799 A1 | 2/2010 | Ast et al. | |
| 2011/0058910 A1 * | 3/2011 | Nedzlek | 408/1 R |
| 2014/0227046 A1 | 8/2014 | Ast et al. | |

FOREIGN PATENT DOCUMENTS

| | | |
|---|---|---|
| DE | 10 2009 028 040 | 2/2011 |
| WO | WO 2006/078517 | 7/2006 |
| WO | 2010/015229 | 2/2010 |
| WO | WO 2010/015229 | 2/2010 |

* cited by examiner

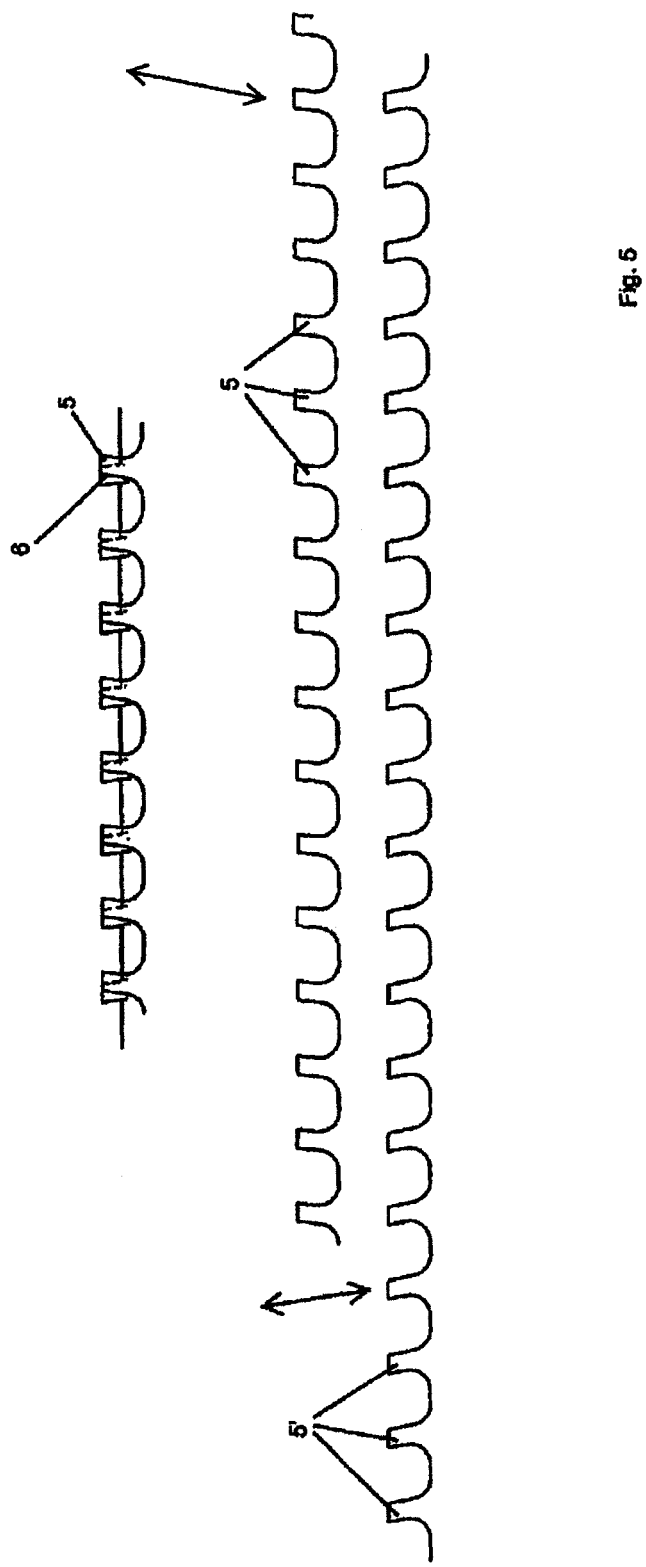

DEVICE AND METHOD FOR GENERATING MICROSTRUCTURES IN CYLINDRICAL SURFACES

RELATED APPLICATION DATA

This application is based on and claims priority under 37 U.S.C. §119(e) to U.S. Provisional Patent Application No. 61/684,446, filed Aug. 17, 2012, the entire contents of which are incorporated herein by reference.

FIELD OF THE DISCLOSURE

The present disclosure is related to a device and a method for generating microstructures in cylindrical surfaces. In particular, the present invention is directed to a device for generating microstructures in cylindrical surfaces, said device comprising a tool body rotatable about an axis and having at least two seats for cutting elements at circumferentially spaced positions, said cutting elements comprising a plurality of micro cutting teeth.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

In particular in the automotive industry, it has turned out that the fuel efficiency of a motor may be substantially improved by using light weight cylinder blocks and coating the inside of the motor cylinders with a hard and wear-resistant coating having favorable gliding properties because the light weight material of the cylinder block as such would have a poor wear resistance.

However, there is the general problem of a sufficient adherence of such coating to the cylinder surface without any flaking during a desired life time of such motor. In order to improve adherence of coatings on motor cylinders, the cylinder surface should not be too smooth and there have been developed many different methods and devices to increase the roughness of the cylinder surface in order to improve the adherence of such coatings. In particular the application of high pressure water jets is one of the methods which have shown to create a surface roughness and surface structure which is suited to provide a good adherence for cylinder coatings. However, water jetting is rather cumbersome and expensive and therefore less suited for industrial mass production.

As an alternative to water jetting which generates a rough but irregular surface, there have been developed methods to provide well defined microstructures by micro milling, i.e. by rotating cutting elements having a well defined geometry of rather small dimensions of typically less than one mm. Such cutting elements may generate surface structures and in particular grooves in the μm-regime (order of magnitude), i.e. with dimensions between 10 and 1000 μm, or more specifically between 100 and 500 μm.

Micro milling is typically performed with a rotating tool having cutting teeth generating one or several spirally wound thread-like grooves. In order to further improve adherence of coatings. It is also known to provide such grooves with an undercut cross section.

The generation of undercut grooves may also include plastic deformation of sides and edges of the grooves or of ridges remaining between adjacent grooves. Also the direct milling of undercut grooves by cutting teeth having a corresponding shape and arrangement is already known in the art.

Examples of corresponding tools and methods are for instance disclosed in US 2005/0064146, EP 09 776 027 and DE 10 2009 028 040.

The known tools and methods for the direct milling of undercut micro grooves are designed to generate a thread like structure by means of cutting teeth following a spirally wound path. Thereby, the micro groove structure is generated by means of a plurality of different cutting teeth successively engaging the same groove upon rotation of the tool, thereby generating the final shape and cross section of the grooves.

This necessarily implies that for generating a completely machined cylinder surface the tool is rotated while being be axially fed with a rather low axial feed rate along the total length of the cylinder, because the pitch of the thread like grooves should not exceed a maximum value in the order of two to five times the width of the individual grooves. Otherwise the adherence of the coating may be reduced due to wide smooth surface portions left between adjacent grooves. This operation requires a large number of revolutions of the tool before the structuring of the cylinder surface is completed.

To improve the cycle time of such tools, in particular where the tool has to be withdrawn through said cylinder after completing the groove structure, it is already known to arrange the respective cutting elements offset to one side of the tool body and reducing the radial extension of the tool on the opposite side, i.e. reducing the tool diameter. It is then possible to exit a hollow cylindrical space without engaging the cylindrical wall, after the surface milling is finished. That is, after finishing the milling process by rotating and axially feeding the milling tool into and through the cylinder, the tool body is radially offset in order to bring the cutting elements out of alignment with the cylinder wall, and then axially withdrawn through the cylinder. Of course, this also implies that the rotation of the tool body during the milling process is effected about the cylinder axis which in turn is offset from any symmetry axis of the tool body in order to allow the tool body and cutting elements to exit the hollow cylindrical space without engaging the cylinder wall.

The microstructures have typical dimensions well below 1 mm, i.e. the depth and width of the grooves provided in the cylindrical surface is below 1 mm, while the pitch may be about twice or three times the groove width and could be up to the order of or slightly larger than 1 mm.

This does of course not exclude the provision of methods and corresponding tools and cutting elements generating corresponding structures with larger or smaller dimensions.

A prior art tool comprising the aforementioned features is known from DE 10 2009 028 040 A1. The cutting elements within this tool are fixedly mounted, i.e. while being still adjustable, they remain in a fixed position when the tool enters a hollow cylindrical body, whereupon the tool is rotated about an axis which is offset from the center of the tool while being axially fed. Finally the whole tool is radially shifted to bring the cutting elements out of alignment with the wall of the work piece and then axially retracted.

As already mentioned, the respective cutting elements are provided to generate spirally wound grooves similar as a thread with a very small pitch. This requires many revolutions of the tool within the hollow cylindrical space until the structured surface is completed.

SUMMARY

In consideration of the aforementioned prior art, it is the object of the invention to provide a method and device for generating microstructures within cylindrical surfaces with a higher degree of efficiency, thereby allowing to provide cylindrical surfaces with a corresponding microstructure in much shorter cycle time.

For increasing the efficiency and reducing the cycle time, the tool according to the present invention is characterized in that said cutting elements are arranged within said seats such as to be radially displaceable in said seats during rotation of said tool body.

Thereby, the present tool has the advantage that the cutting elements can be evenly distributed about the circumference of the tool at the same radial distance, wherein the tips of the cutting teeth and also the seats define a common cylindrical envelope surface the axis of which coincides with the axis of the tool body. Still, the cutting elements are radially displaceable at least between two different radial positions, namely a radially retracted and a radially extended position.

Thereby, the tool may be designed such that with all cutting elements in the retracted position, the tool body may axially enter the hollow cylindrical space, without touching the cylindrical wall thereof which is to be structured by means of the tool, wherein the axis of the cylindrical surface and the tool axis are coinciding. Upon starting rotation of the tool, the cutting elements may simultaneously be extended towards a radially extended position, whereby the cutting teeth of the cutting elements enter and engage the cylindrical wall. A plurality of cutting teeth may simultaneously engage the work piece such as to generate a plurality of corresponding grooves.

Advantageously, the tool may be rotated without any axial feed wherein a plurality of cutting teeth are generating parallel circumferential (i.e. circular) grooves in the surface of the work piece. Each groove is generated by at most a single revolution of the tool body, wherein each cutting element may comprise a plurality of cutting teeth, in particular more than 10 and more preferably more than 30 cutting teeth, which, according to one embodiment, are favorably arranged at the same pitch and all have the same cross section and shape. Thereby, a corresponding number of parallel grooves is generated in parallel.

Of course, the tool might still be axially fed in a manner according to the prior art such that the grooves generated by one of the cutting elements are engaged by the cutting teeth of a cutting element following next to the first cutting element etc. With a number of parallel cutting teeth arranged in an axially extending row, the pitch of the axial feed of the tool might be increased to a corresponding multiple of the pitch between adjacent grooves, which again would substantially increase the cycle time, when compared to the prior art. One advantage of such embodiment may be that the grooves could be generated by means of cutting teeth having a dove tail cross section because they could enter the cylindrical surface at one axial end of the cylinder and exit at the other axial end. There upon the cutting elements may be retracted and axially withdrawn through the cylinder without touching the wall thereof.

Nevertheless at least as long as the cutting teeth do not have a dove tail cross section or any other cross section with a wider head portion than the base of the cutting tooth, the simultaneous generation of a plurality of parallel circular grooves without any axial feed or with only intermediate axial feed of the tool (i.e. after rotation of the cutting tool and retraction of cutting elements) may still be the preferred method of operation.

In a one embodiment and according to be able to produce grooves with an undercut cross section, the individual cutting teeth are provided with flank cutting edges extending at an acute angle to the tool axis. With such a shape of the cutting teeth, the cutting elements, when moved towards the radially extended position, are simultaneously moved along the axial direction such that the combined radial and axial movement of the cutting element follows the direction defined by the said flank cutting edges. Such cutting teeth would preferably have a cross section which would be either tapering towards the head or top of the tooth, or have a constant width.

Still, due to the combined radial and axial movement of the cutting elements, it is possible to retract the cutting elements at any axial position within said cylinder without damaging the generated undercut structure. It is thus one advantage of the present invention, that the structuring may be restricted to just a part of the cylinder surface, if desired. In contrast, any prior art tool generating an undercut structure would have to enter and exit the cylindrical wall at the axial ends thereof in order to avoid any damage of the structure when radially offsetting the tool.

In another embodiment, at least two different cutting elements are provided on each tool, wherein the cutting elements are distinguished from each other by having cutting teeth, the flanks of which are forming an acute angle with the tool axis towards opposite directions. Accordingly, when considering a tool having a front and a rear end wherein the cutting elements extend parallel to the front- to rear direction, an acute angle between the axis of the cutting teeth edge flanks is formed when measured towards the rear end of the tool; while the respective edges of the cutting teeth of the other cutting element are forming an acute angle when measured towards the front end part of the tool axis. In other words, at least one of the flanks of each of the different cutting teeth is inclined with respect to a plane perpendicular to the tool axis, wherein the different cutting elements are distinguished from each other by having their respective cutting teeth flanks inclined towards opposite sides of said plane. Depending on the direction of inclination of the cutting teeth flank, the teeth might be distinguished by the term "left handed" or "right handed" cutting teeth or cutting elements, respectively.

Moreover, in one embodiment the cutting teeth of different cutting elements are arranged such that upon a corresponding amount of angular movement, they engage the same grooves as previously generated by the cutting teeth of the respective other cutting element. By such an arrangement, one set of cutting teeth may generate an undercut along one side face of the groove while the other set of cutting teeth generates the undercut on the other side face of the groove. Of course additional tools for chamfering the edges of the grooves or for plastic deformation of the ridges between the grooves may still be provided. Still both types of cutting teeth would not necessarily have a dove tail or similar cross section, but would preferably have a constant width or tapering shape while still one flank would define the undercut.

In one embodiment, the cutting elements are arranged in pairs, wherein each one of a pair of cutting elements is different from the other and the cutting elements are arranged on diametrically opposite sides of the tool body.

Accordingly, when radially extended the oppositely arranged cutting elements are each generating at least one groove comprising undercut flanks with opposite inclination, so that after rotation of the tool by about 180°, the cutting elements of one cutting element engage the groove already generated by the respective opposite cutting element for cutting the respective other undercut flank, so that after a complete revolution of 360°, a groove with two undercut flanks is finished.

Moreover, in the preferred embodiment each cutting element comprises a plurality of teeth suitably provided along the edge of an elongate, plate-like cutting element in the preferred embodiment, the number of (identical) teeth would be at least 10 and might be raised to 30 or even 50, so that once a tool is equipped with corresponding cutting elements each having 35 teeth, one revolution of the tool with extended cutting elements would generate a first set of 35 parallel undercut grooves extending in a plane perpendicular to the axis of the tool and the cylinder. The cutting elements might then be radially retracted and, after an axial feed of the tool corresponding to the length of the row of 35 cutting teeth, would be rotated and radially extended again.

Alternatively, another set of two cutting elements might be arranged at another axial position such as to generate a set of grooves adjacent the first set grooves and simultaneously therewith.

Moreover, additional pairs of cutting elements could be provided at different angular positions, such as to have for instance three pairs of oppositely arranged different cutting elements alternatingly arranged around the periphery of the tool.

If the cutting elements with left-handed and right-handed cutting teeth are alternatingly positioned at 60° angular distance (at the same axial position), while the teeth of all cutting elements would be aligned in common parallel planes perpendicular to the axis of the tool, a complete undercut microgroove could be obtained by rotation of the tool of only about 120° or slightly more when taking into account the angle which is required to have the cutting teeth fully extended and retracted after finishing the groove.

As an alternative, the pairs of cutting elements could be offset with respect to each other along the axial direction about the full length of the cutting edge of each cutting element (e.g. a plurality of 35 teeth).

With such an arrangement and three pairs of cutting elements axially offset, the total number of grooves to be produced with a single revolution of the tool could be raised to 105 (=3×35, assuming that each cutting element has a number of 35 identical teeth).

Of course, rather than providing two different cutting elements, the structure could as well be generated by more than just two different cutting elements. In particular, a first cutting element might have straight rectangular or tapered cutting teeth in order to produce a groove having a corresponding cross section, which is then entered and completed to an undercut groove by the cutting elements described above.

Further, the seats of the tool bodies might be provided with fine adjustment means, in order to align the cutting teeth of all cutting elements in a proper manner and in particular the cutting teeth of pairs of cutting elements generating one or several parallel common grooves. Of course, the cutting elements may be mounted in cartridges having fine adjustment means or providing means for adjusting the cartridges, and the cutting elements may be moveable between the radially retracted and extended positions by a corresponding radial movement of cartridges receiving and supporting the cutting elements In a preferred embodiment, the cutting elements (or cartridges) would be biased toward the retracted position and would be extended by applying a corresponding force acting towards the extended position.

In one embodiment, the force for extending the cutting elements would be applied by the pressure of a cooling or flushing liquid supplied through a channel extending through the tool body.

In particular, a radial inner abutment face of the cutting elements or cartridges could be in flat surface contact with a radially outer seat surface of a wedge shaped bar resting on a support surface of the tool, said support surface being slightly tilted towards the tool axis. By axially shifting the bar or a corresponding plurality of bars which may be connected to each other, the seat surface moves radially outward or inward, depending on the direction of axial feed. Thereby, the cutting elements would be radially extended or retracted, respectively.

The method according to the present invention requires a tool to be used defining a cylindrical surface on which at least two cutting elements are mounted in seats at angularly spaced positions, each cutting element having at least one cutting tooth and being displaceable between a radially retracted and a radially extended position. The method according to the present invention is characterized in that the axis of such a tool is aligned with the axis of a cylindrical surface to be treated, whereupon the tool body is moved along this common axis until the cutting elements have reached the desired position vis a vis the cylindrical surface. Then, during or upon starting rotation of the tool with respect to the cylindrical surface, the cutting elements are radially extended to engage the cylindrical surface, thereby generating at least one groove within said cylindrical surface.

In one embodiment, the method comprises alignment of the cutting elements with respect to each other such that, once the tool has been rotated about its axis by the angular distance between said cutting elements, the at least one cutting tooth of each cutting element engages the groove generated by the at least one cutting tooth of the preceding cutting element. In another embodiment, an additional axial component of movement is imparted to the cutting element during the radial movement thereof between the retracted and extended positions and vice versa, wherein the direction of the resulting axial and radial movement follows the line of inclination of the cutting teeth flanks with respect to the tool axis for generating undercut side faces of the grooves In a further embodiment two different cutting elements are provided, each cutting element having at least one cutting tooth comprising a flank including an acute angle with the axis of the tool, i.e. inclined with respect to a plane perpendicular to the tool axis, wherein the cutting elements are different by the respective cutting teeth having their flanks forming acute angles with the tool axis towards different ends of the axis, i.e. inclined towards different sides of said plane, wherein the radial and axial movement upon extension and retraction of the cutting elements occurs along a line parallel to the respective tooth flank.

This means, that the cutting elements having different cutting teeth, i.e. oppositely inclined cutting tooth flanks, are moved in opposite axial directions when being radially extended.

According to a preferred method, a tool will be used in which the cutting elements have a plurality of teeth, preferably at least 10 and more preferably more than 30 cutting teeth per cutting element. In another preferred embodiment, at least two or more pairs of cutting elements are provided on a tool and simultaneously operated between the radially retracted and extended positions.

Further, it is preferred to arrange the cutting teeth in a manner that the cutting teeth of a pair of cutting elements are arranged in pairs at the same axial position such that without any axial feed of the tool upon engagement with the work piece, the cutting teeth of each pair of cutting elements mutually engage the grooves generated by the cutting teeth of the preceding cutting element.

According to another method, an additional axial feed could be imparted to the tool during rotation whereupon each cutting element would generate at least one and preferably a plurality of parallel, spirally wound grooves, wherein the axial feed of the tool should be adapted to any axial offset of the cutting elements with respect to each other, such that still the cutting teeth of one cutting element engage the same grooves as the cutting teeth generated by a preceding cutting element.

Depending on the angular distance between the pairs of cutting elements generating a common set of grooves the cutting tool rotation can be limited to one revolution or slightly more taking into account an additional angular distance for engaging the work piece, whereupon the tool may be shifted to another axial position vis a vis another non-structured part of the surface of the work piece adjacent the previously generated microgrooves. The cutting elements may then again be extended while the tool is rotated, and retracted after a full revolution of the extended cutting elements. Then, another axial tool position may be adjusted to repeat the structuring operation until the complete cylindrical surface has been structured.

A corresponding tool may also comprise a plurality of cutting elements, preferably arranged in pairs and distributed along the total length and at preferably equal angular distances. For instance there may be arranged two or three cutting elements at the same circumferential position but at different axial positions while at another angular position another two or three cutting elements might be arranged and aligned adjacent to each other along the axial direction. The angular distance between the sets of cutting elements may vary between 30° and 180° depending on the number of cutting elements and seats.

The groups of cutting elements oriented along the longitudinal or axial direction may also be slightly offset along the circumferential direction, in order to avoid any gap in microstructure between adjacent cutting elements. In an alternative embodiment, where a gap would be provided between adjacent cutting elements aligned along the axial direction, the next set of cutting elements could be offset axially and along the circumferential direction to cover the respective gaps.

One particular advantage of the present tool and method is that not only an inner cylindrical surface, i.e. the wall of a hollow cylindrical space, can be machined in the way described, but the same principles could also be applied to a tool and method for forming microstructural grooves on an outer cylindrical surface of a massive cylindrical body. In that case, the cutting elements would be mounted on the inner wall of a hollow tool body defining an inner cylindrical envelope surface and again be radially (and axially) moveable between retracted and extended positions, wherein the terms "retracted" and "extended" refer to the hollow cylindrical envelope surface, so that "extended" means radial inwardly extended in engagement with a work piece while "retracted" means radial outwardly away from the work piece.

BRIEF DESCRIPTION OF THE DRAWING

Further features, advantages and possible ways to use the present invention may be apparent from the following description of preferred embodiments described with reference to the appended drawings.

FIG. 5 shows schematically the engagement of cutting elements with work piece and two rows of different cutting teeth and the corresponding direction of extension and retraction.

DETAILED DESCRIPTION

Figure 1:
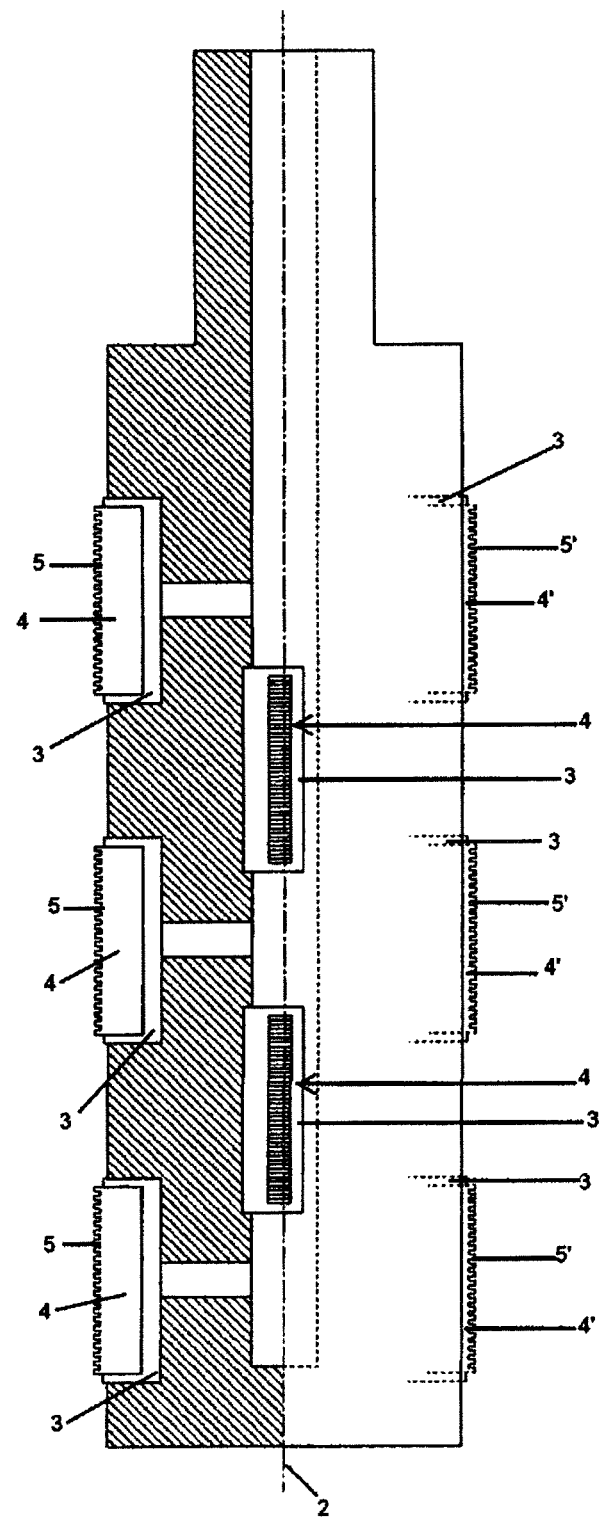
FIG. 1 shows a schematic view of a tool according to the present invention, partially in section, according to a first embodiment.

FIG. 1 is a side view of a just schematically displayed, basically cylindrical tool according to the present invention, comprising a substantially cylindrical tool body 1 having a number of seats 3 for receiving cutting elements 4 and 4', respectively.

The left hand part of the cylindrical tool body is shown in a section including the axis 2 of the tool. As can be seen on the left hand side, there are arranged three seats 3 axially arranged in a row one behind the other, each seat 3 receiving a cutting element 4 having in turn a row of cutting teeth 5 along one edge thereof. The cutting teeth 5, 5' are better visible in the enlarged view of FIG. 5 showing two different types of cutting teeth and the engagement thereof with the work piece.

As schematically depicted in FIG. 1, the cutting elements 4, 4' have some axial and radial play in seats 3 such as to be moveable between a radially retracted and a radially extended position and also for some movement along the axial direction. In the radially retracted position, the total diameter of the tool body 1 including the cutting elements 4 and the cutting teeth 5, 5', thereof, is smaller than the inside diameter of a hollow cylindrical work piece, the inner cylindrical surface of which is to be structured by the cutting teeth 5, 5' of the cutting elements 4, 4'. In the radially extended position, the total diameter of the cutting tool including cutting element 4, 4' and cutting teeth 5, 5' is larger than the inside diameter of the work piece, in particular by an amount corresponding to two times the desired depth of the microgrooves.

This means, that for producing the microgrooves in the hollow cylindrical surface of the work piece, the tool may be axially entered into the hollow cylindrical space with all cutting elements 4, 4' in their radially retracted position, until the cutting elements 4, 4' are facing the surface of the work piece to be structured.

Then, upon starting or during rotation of the tool (without axial feed), the cutting elements 4, 4' are radially extended, thereby engaging and penetrating the hollow cylindrical surface of the work piece.

If the cutting teeth 5, 5' should have a rectangular cross section, or more generally spoken no undercut flanks, they may simply be extended along the radial direction. However, in as far as at least one of the flanks of the cutting teeth defines an undercut, i.e. includes an acute angle with the tool axis, the cutting elements should be imparted an additional axial movement when radially extended. Particular guiding means (not shown) may be provided on the one hand within the seats 3 and on the other hand on the cutting elements 4, 4', in order to guide the cutting elements and cutting teeth 5, 5' along a desired direction, which includes the same angle with the axis of the cutting tool as the respective tilted flange of the cutting teeth 5, 5'.

Figure 2:
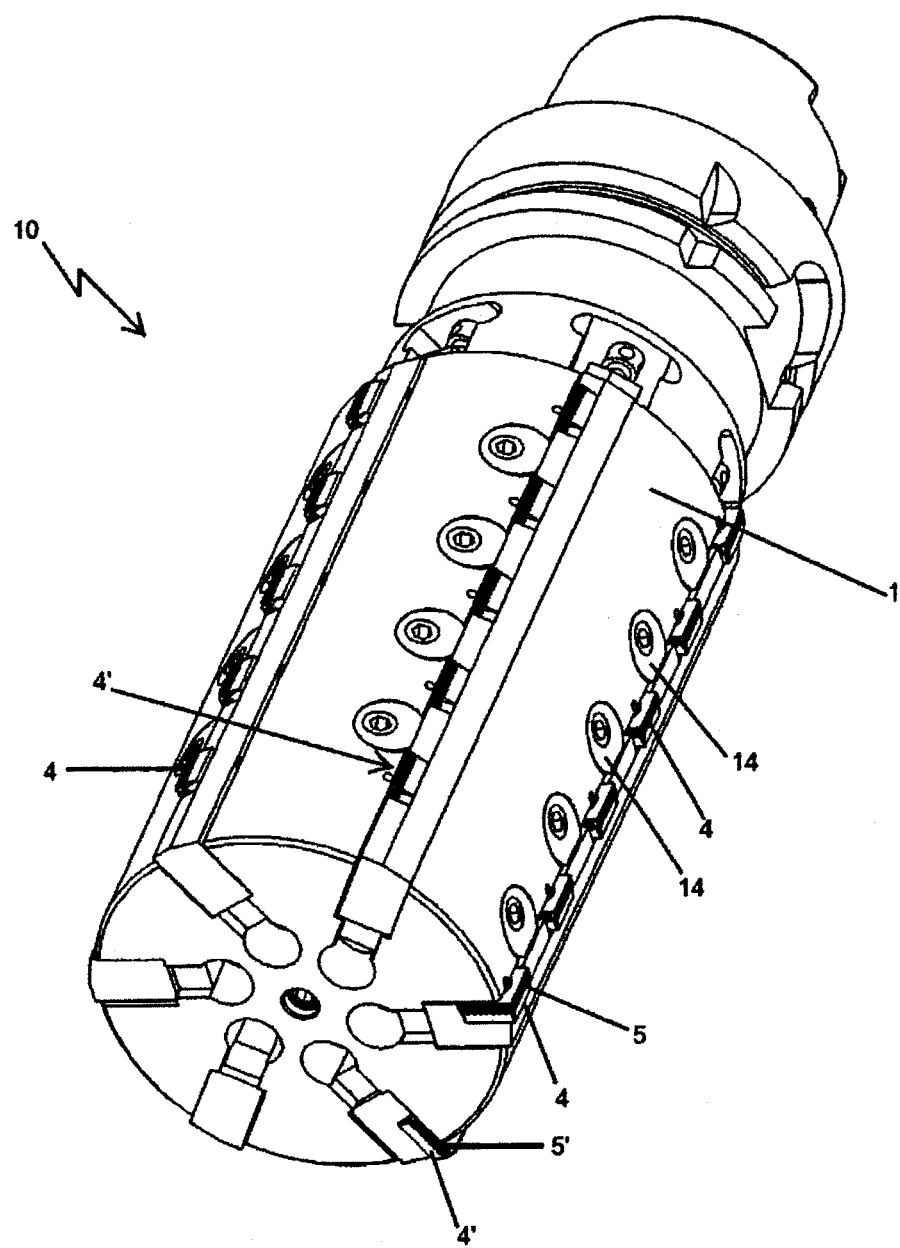
FIG. 2 shows a perspective view of another embodiment of a corresponding cutting tool.
Figure 3:
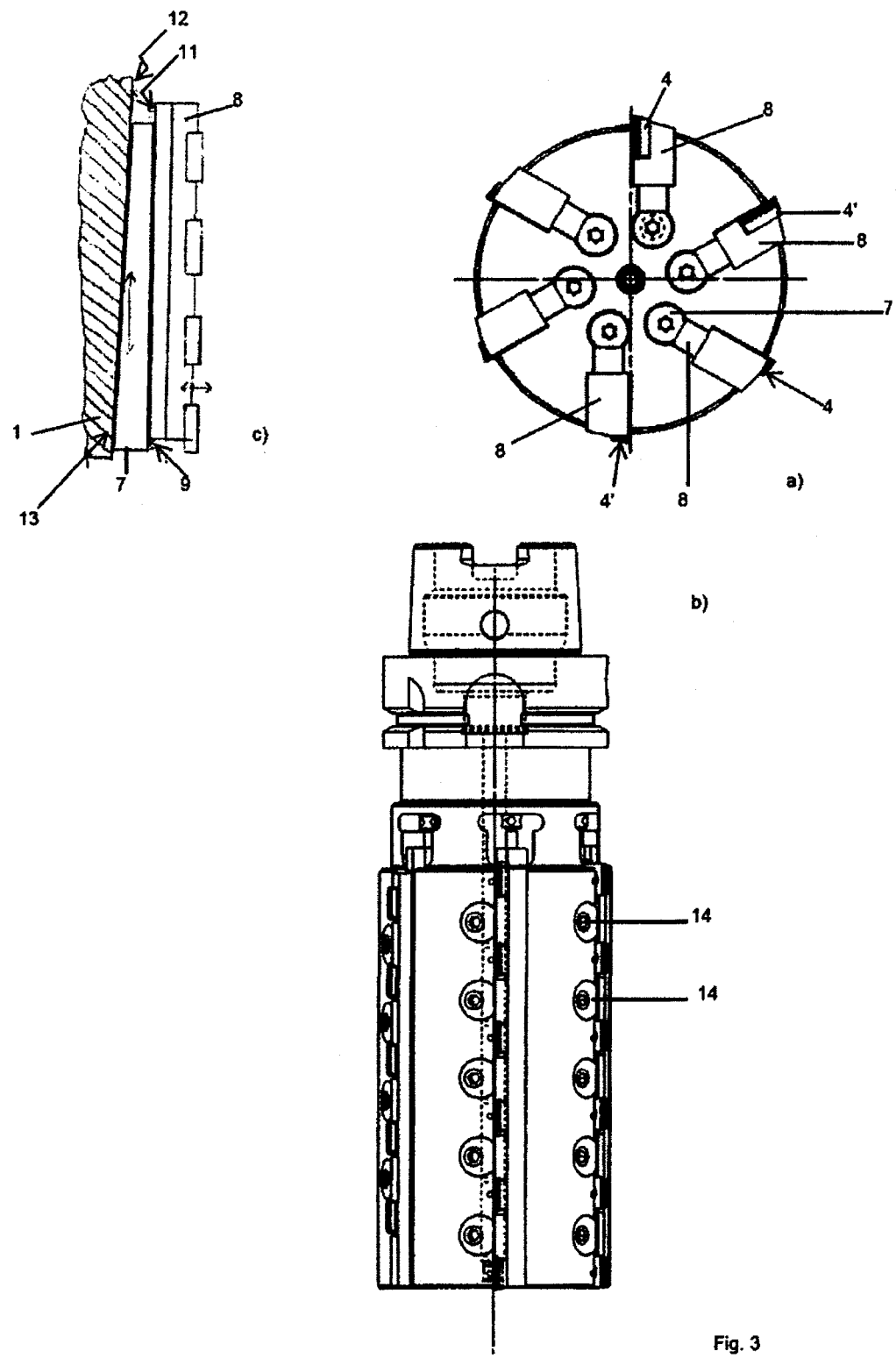
FIG. 3*a* shows a front view the embodiment of FIG. 2.
FIG. 3*b* shows a side view the embodiment of FIG. 2.
FIG. 3*c* illustrates a mechanism for the radial extension/retraction of cutting elements in the embodiment of FIG. 2.

Of course, the same would hold if the cutting elements are mounted in cartridges such as shown in the embodiment of FIGS. 2 and 3.

With the embodiment of FIG. 1, the cutting teeth 5 on one side of the tool body 1, are engaging the same grooves as the respective cutting teeth 5' on the diametrically opposite side of the tool body 1. However, in as far as the flanks of the cutting teeth are inclined towards opposite sides of a plane perpendicular to the tool axis 2, the axial movement during a radial extension of the cutting element 4' imparted to the cutting element 4' bearing cutting teeth 5' would be opposite to the direction of axial movement imparted to the cutting element 4 bearing cutting teeth 5, because the flanks of the cutting teeth 5, 5' are inclined towards opposite directions.

Still, provided that the respective cutting teeth 5, 5' are engaging the same set of grooves, a full revolution of the tool body 1 will generate undercut microgrooves along the full circumference of the work piece.

The successive engagement with the work piece is schematically illustrated in FIG. 5, showing in the lower part of the drawing two rows of cutting teeth of two different cutting elements 4 and 4', respectively. The lowermost row has cutting teeth of nearly rectangular cross sectional shape but with the sides or flanks slightly inclined towards the left, which may thus be called "left handed" teeth, while the row of cutting teeth there above have the same basic shape but are slightly inclined towards the right (i.e. "right handed" teeth) so that the flanks of the cutting teeth 5, 5' each include an acute angle with the axis of the tool (when the cutting elements 4, 4' are mounted); but the acute angle is formed towards the opposite ends of the axis 2. Two double arrows indicate the direction of the combined axial and radial extension (or retraction) once the cutting teeth 5, 5' are moved from their radially retracted to the radially extended position and vice versa. As can be seen, in this plane the direction of movement is parallel to the direction of the flanks of the cutting teeth.

It goes without saying that it is not necessary to have both flanks of the cutting teeth extending parallel and in fact the side of the cutting teeth which is not forming the undercut may extend at a another angle with respect to the tool axis to form a tooth having a wider or narrower base. Still, on that side an undercut is obtained by the cutting teeth of a different cutting element).

As indicated in the upper part of FIG. 5, a first part of microgrooves 6 has been generated in a surface by the lower row of cutting teeth 5', having their flanks tilted to the left hand side in the figure. In FIG. 5, the same grooves 6 are shown in engagement with the upper row of right-handed cutting teeth 5, just forming a corresponding undercut on the opposite right hand side of the grooves 6.

The individual cutting teeth 5, 5' may have a width of less than 500 micron, in particular about 250 micron, and the cutting teeth length may be in the order of 200 to 800 micron, in particular about 550 micron. The pitch between the cutting teeth 5, 5' may be in the order of 1000 μm for this particular embodiment.

FIG. 2 shows a more realistic representation of an alternative embodiment of a cutting tool according to the invention in a perspective view while FIGS. 3a and 3b show the same tool in a front view and a side view, respectively.

As can be seen, in this case there are provided several sets of cutting elements 4, 4' arranged in six axially extending rows, wherein the angular distance between two succeeding rows is 60°.

Each two cutting elements 4, 4' of two circumferentially successive rows are forming a pair by having cutting elements 4, 4' properly aligned with each other but provided with different cutting teeth 5, 5' such as described as left-handed and right-handed cutting elements with respect to FIG. 5.

Figure 4:
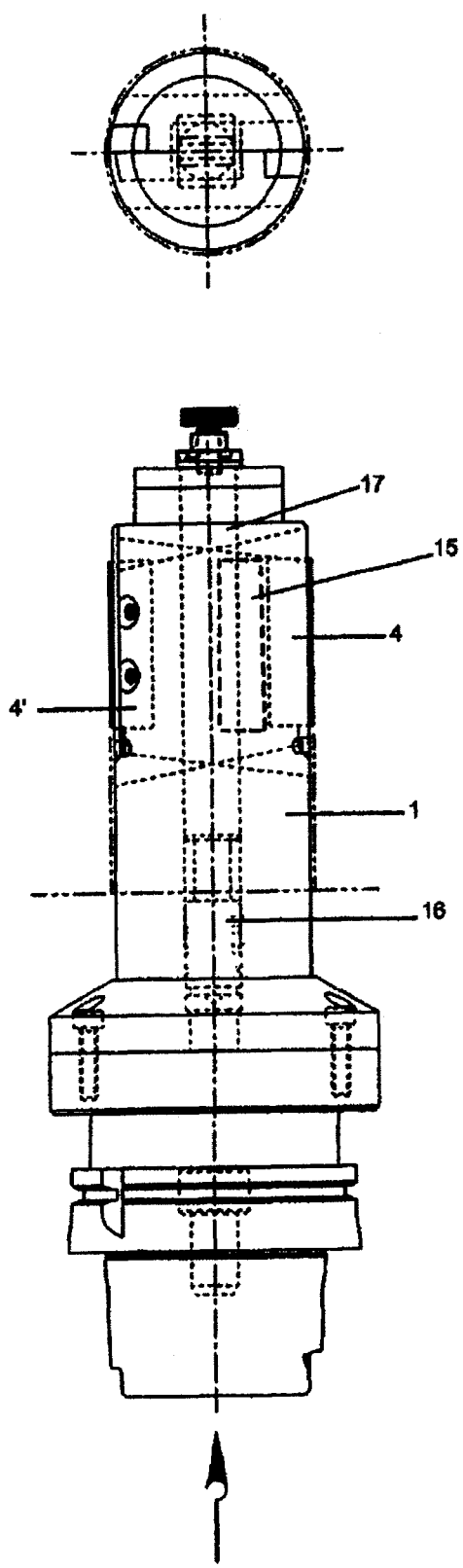
FIG. 4 is a schematic representation of another embodiment with a central actuation device for the cutting elements to be radially extended and retracted.

Between two adjacent cutting elements 4, 4' along each axial row of cutting elements there is a gap, wherein the next two axial rows of cutting elements 4, 4' are arranged to cover at least a part of that gap and any remaining gap may be closed by the two next following rows of cutting elements 4, 4'. Of course, in order to provide sufficient space for fine adjustment means and biasing means (not shown), the gap between adjacent cutting elements of a row may be larger than an axial length of the row of teeth of a cutting element. Therefore the number of rows or pairs of rows axially offset with respect to each other may be three (as shown in the embodiment of FIGS. 2 to 4) or even more, if required.

The total axial length of such a tool is of course adapted to the total axial length of a corresponding hollow cylindrical body which is to be machined with the tool. With a corresponding tool and by just about a single revolution of the tool body, it will be possible to provide the complete cylindrical surface of a hollow cylindrical body with a large number of parallel microgrooves with a pitch of 1 mm or even less. The dimensions of the grooves in terms of width and depth are in the order of 0.1 to 0.5 mm and also the space between two adjacent grooves 6 is in the order of 0.5 mm (which should not be construed to limit the claimed device and method).

In this embodiment, the combined radial/axial movement of the cutting elements 4, 4' is effected by means of wedge shaped actuation bars 7 engaging the abutment face 11 of a cartridge 8 which in turn supports the cutting elements 4 or 4' respectively. The function of these means is schematically illustrated in FIG. 3c. The radial inner abutment face of the cartridge 8 is in flat surface contact with the radially outer seat surface 9 of the wedge shaped bar 7, which in turn is supported on a support surface 12 in the tool body in an axially moveable manner. The support surface 12 and the wedge surface 13 abutting thereon are slightly inclined with respect to the tool axis. By axially (upward) shifting the bar 7 or a corresponding plurality of bars 7 which may even be connected to each other, the seat surface 9 thereof pushes the cartridge 8 radially outward by engaging the abutment surface 11 because both, the support surface 12 and the wedge surface 13, are inclined with respect to the tool axis 2 by an angle which may be in the order of 2 to 10°. A radial inward movement of the cartridge will be effected by corresponding biasing means upon axially retracting the wedge shaped bar 7.

Thereby, the cutting elements will be radially extended or retracted, respectively.

It goes without saying that the cartridges may be provided with adjustment means (not shown) for adjusting the exact position and alignment of the cutting elements 4, 4' and in addition there may be further means for adjusting the seats of the cartridge with respect to the abutment surface 11 thereof. Guiding means 14 between the cartridges and the tool body may be designed to ensure the proper axial component in addition to the mainly radial movement of extension and retraction.

FIG. 4 is a side view of another embodiment comprising fluid channels for supplying a flushing or cooling agent which may further be used for actuating an actuation element which is this case is a central bar 16 having a wider diameter section neatly fitting with a central channel 17. The function is similar as with the bars 7 described in connection with FIG. 3. The cutting elements 4, 4' are supported by seating elements 15 having an axially extending abutment surface partly entering the central channel 17 within the tool body 1 via a corresponding slot. By supplying an axial pressure the central bar 16 is axially advanced, thereby pushing the seating elements extending into the central channel and thus the cutting elements to a radially extended position. Slanted ends of either the central bar 16 and/or the seating elements 15 may facilitate the engagement between the bar 16 and the abutment surface of the seating elements 15.

As an alternative, the bar might be configured as a cam shaft by having a no circular (i.e. elliptic) cross section and extend into the central channel 17, wherein the extension and retraction of the cutting elements would be effected by rotation of the bar wherein the seating elements would get into and out of engagement with the cam surfaces of the shaft to become radially extended or retracted, respectively.

The cutting elements 4, 4' may be biased towards their radially retracted position and can be radially extended by supplying the pressure from a coolant supply channel to the corresponding actuation bar 16 or cam shaft.

The actuation of the cutting elements may be effected with any means suited therefor, like hydraulic, pneumatic, mechanical or electric (electromagnetic) means.

For the purpose of original disclosure it is to be noted that any features which may be gathered by a skilled person from the present description, the drawings and the claims, even if only described in connection with particular further features, may be combined individually as well as in arbitrary combinations with any other of the features or groups of features disclosed herein, unless this is explicitly excluded or technical conditions would render such combinations impossible or senseless. The comprehensive, explicit discussion of any combinations of features which might be thought of is dispensed with just for the sake of brevity and legibility of the description and claims.

What is claimed is:

1. A device for generating microstructures in cylindrical surfaces, comprising:
    a tool body rotatable about a tool axis, having at least two seats for cutting elements at circumferentially spaced positions and cutting elements comprising a plurality of micro cutting teeth,
    wherein said cutting elements are arranged within said seats such as to be radially and axially displaceable in said seats during rotation of said tool body,
    wherein said cutting elements are in the shape of elongate plates comprising cutting teeth at least along one of the longitudinal edges of said plate,
    wherein said cutting teeth comprise at least one cutting edge forming an acute angle with the tool axis, and
    wherein cutting edges of at least two different cutting elements are provided each of which cutting edges forming an acute angle with the tool axis, the acute angle of a first one of said at least two different cutting elements being oriented towards a first direction relative to the tool axis which is opposite to the orientation of the acute angle of a second one of the at least two different cutting elements.

2. The device according to claim 1, wherein guiding means are provided in said seats and on said cutting elements imparting an axial component of movement to said cutting elements simultaneously with any radial movement.

3. The device according to claim 1, wherein said cutting elements are displaceable between at least one radially retracted and one radially extended position.

4. The device according to claim 1, wherein at least a plurality of said cutting teeth have the same shape and are arranged at a constant pitch.

5. The device according to claim 1, wherein the cutting teeth of said at least two different cutting elements are arranged with respect to each other along the axial direction such that, upon rotation of said tool about the tool axis, said cutting teeth mutually engage grooves generated by the respective cutting teeth of a respective preceding other cutting element.

6. The device according to claim 5, wherein the cutting elements of at least one pair of different cutting elements are provided on diametrically opposed sides of the tool body.

7. The device according to claim 1, wherein the cutting elements of at least one pair of different cutting elements are provided on diametrically opposed sides of the tool body.

8. The device according to claim 1, wherein said cutting elements are biased towards a retracted position towards the tool body.

9. The device according to claim 1, comprising radial displacement means in fluid communication with a cooling or flushing channel.

10. The device according to claim 1, comprising radial displacement means, wherein the radial displacement means are wedge shaped bars forming a radial outer seating surface for the cutting elements and a radially inner sliding surface for sliding along a support surface which is tilted with respect to the tool axis.

11. The device according to claim 10, wherein the radial displacement means are either hydraulically, pneumatically, mechanically, electrically or electromagnetically driven.

12. The device according to claim 1, wherein at least three pairs of different cutting elements are arranged alternatingly under uniform angular distances about a periphery of the tool body.

13. The device according to claim 12, wherein each of the pairs of different cutting elements is arranged at a different axial position than another pair of different cutting elements.

14. The device according to claim 1, wherein the generated microstructures include grooves having a depth and a width in the cylindrical surface that are less than 1 mm.

15. A method for generating microstructures in cylindrical surfaces of a work piece with the device according to claim 1.

16. A method for generating microstructures in cylindrical surfaces of a work piece with a tool body rotatable about a tool axis, said tool body comprising at least two angularly spaced seats receiving cutting elements, said cutting elements having a plurality of micro cutting teeth, the method comprising:
    aligning the tool axis of said rotatable tool with an axis of said cylindrical surface, while said cutting elements are retracted towards the tool body in an inactive radial position;
    arranging the tool body at an axial position with respect to the cylindrical surface corresponding to a position where the cutting elements are to produce the microstructure on said surface; and
    during rotation of the tool body, radially extending said cutting elements into an active cutting position and engaging said cylindrical surface to generate said microstructures,
    wherein said cutting elements are imparted an additional axial component of movement during the radial movement thereof,
    wherein at least two different cutting elements are provided, the cutting edges of which form an acute angle with the tool axis, the acute angle of a first one of said at least two different cutting elements being oriented towards a first direction relative to the tool axis which is opposite to the orientation of the acute angle of a second one of said at least two different cutting elements, wherein the two different cutting elements are imparted an axial component of movement towards opposite axial directions while simultaneously being moved in the radial direction, and wherein any axial feed of the tool body upon rotation thereof while the cutting elements are in engagement with the work place is adapted to a pitch of the cutting elements such that the cutting teeth of a pair of cutting elements which are arranged at different circumferential positions of the tool body engage the same grooves of the microstructure which have been generated by a preceding cutting teeth of the respective other cutting element.

17. The method according to claim 16, wherein said cutting elements are biased towards a radially retracted position and are extended towards a radial extended position by applying a pressure of a cooling- or flushing media within the tool body.

18. The method according to claim 16, wherein a plurality of parallel circumferential circular undercut grooves are generated in parallel without any axial feed of the tool body.

19. The method according to claim 16, wherein the generated microstructures include grooves having a depth and a width in the cylindrical surface that are less than 1 mm.

20. The method according to claim 19, wherein a pitch of the grooves is two to three times the groove width.

21. A device for generating microstructures in cylindrical surfaces, comprising:
- a tool body rotatable about a tool axis, having at least two seats for cutting elements at circumferentially spaced positions and cutting elements comprising a plurality of micro cutting teeth,
- wherein said cutting elements are arranged within said seats to be radially and axially displaceable relative to surfaces of the seat during rotation of said tool body,
- wherein said cutting elements are in the shape of elongate plates comprising cutting teeth at least along one of the longitudinal edges of said plate,
- wherein said cutting teeth comprise at least one cutting edge forming an acute angle with the tool axis, and
- wherein cutting edges of at least two different cutting elements are provided each of which cutting edges forming an acute angle with the tool axis, the acute angle of a first one of said at least two different cutting elements being oriented towards a first direction relative to the tool axis which is opposite to the orientation of the acute angle of a second one of the at least two different cutting elements.

* * * * *